United States Patent
Gratton

(10) Patent No.: US 12,542,939 B2
(45) Date of Patent: Feb. 3, 2026

(54) SYSTEMS AND METHODS FOR GENERATING NON-FUNGIBLE TOKENS CORRESPONDING TO RECORDINGS OF LIVE EVENTS

(71) Applicant: DISH Network L.L.C., Englewood, CO (US)

(72) Inventor: Max Gratton, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 670 days.

(21) Appl. No.: 17/809,250

(22) Filed: Jun. 27, 2022

(65) Prior Publication Data
US 2023/0421827 A1    Dec. 28, 2023

(51) Int. Cl.
| | | |
|---|---|---|
| *H04L 9/32* | (2006.01) | |
| *G06Q 20/36* | (2012.01) | |
| *G06Q 30/0601* | (2023.01) | |
| *G06Q 30/08* | (2012.01) | |
| *H04L 9/08* | (2006.01) | |
| *H04N 21/254* | (2011.01) | |
| *H04N 21/478* | (2011.01) | |
| *H04N 21/845* | (2011.01) | |

(52) U.S. Cl.
CPC ....... *H04N 21/2541* (2013.01); *G06Q 20/367* (2013.01); *G06Q 30/0621* (2013.01); *G06Q 30/08* (2013.01); *H04L 9/088* (2013.01); *H04L 9/3213* (2013.01); *H04N 21/478* (2013.01); *H04N 21/8456* (2013.01); *H04L 2209/60* (2013.01)

(58) Field of Classification Search
CPC ............. H04N 21/2541; H04N 21/478; H04N 21/8456; G06Q 20/367; G06Q 30/0621; G06Q 30/08; G06Q 20/0855; G06Q 20/1235; H04L 9/088; H04L 9/3213; H04L 2209/60; H04L 9/50
USPC ............................................................ 705/50
See application file for complete search history.

(56) References Cited

U.S. PATENT DOCUMENTS

| | | | |
|---|---|---|---|
| 8,099,364 B2 * | 1/2012 | Padhye .................. | H04L 67/34 380/277 |
| 10,009,663 B1 * | 6/2018 | Hoffman ............ | H04N 21/2353 |
| 10,575,061 B1 * | 2/2020 | Pinel .................. | H04N 21/4223 |
| 2003/0097307 A1 * | 5/2003 | Greene .................. | G06Q 20/20 705/26.1 |
| 2015/0294370 A1 * | 10/2015 | Nagarajayya ...... | G06Q 30/0275 705/14.66 |
| 2020/0134139 A1 * | 4/2020 | Vaish .................. | G06F 16/1805 |

* cited by examiner

*Primary Examiner* — Zeshan Qayyum
(74) *Attorney, Agent, or Firm* — Perkins Coie LLP

(57) ABSTRACT

A method for generating a non-fungible token (NFT) that corresponds to one or more potential recordings of one or more segments of a live event. The method can include displaying one or more available NFTs to a user, each available NFT including a start marker and an end marker defining a segment of the live event. Prior to occurrence of the segment of the live event, a user selection of at least one available NFT of the one or more available NFTs is received and transmitted to a NFT generator. Upon an occurrence of the selected at least one available NFT, data is received confirming an association between an NFT and a recording of the segment defined by the selected at least one available NFT.

20 Claims, 11 Drawing Sheets

| Available NFTs Description | Price/Bid | Type | Purchasers/ Bidders | Copies | Likelihood % |
|---|---|---|---|---|---|
| 211 Last Score | $1,000 | Exclusive | 1 | 1 | 75 |
| 212 Next Interception ☆ | $200 | Market | 3 | 3 | 30 |
| 213 Next Play | $500 | High Bid | 4 | 1 | 100 |
| 214 Next Score | $300 | Dutch | - | 1 | 75 |
| 215 Last Play | $600 | Uncapped | 10 | 10 | 100 |
|  |  |  |  |  |  |
|  |  |  |  |  |  |

One or more delivery preferences is not available for the selected option.

SYSTEMS AND METHODS FOR GENERATING NON-FUNGIBLE TOKENS CORRESPONDING TO RECORDINGS OF LIVE EVENTS

BACKGROUND

In live events, such as sporting events, certain things happen that become famous. For example, a great touchdown completion or last minute comeback, especially during an important game, can become well known. Video of these types of events sometimes become popular through a viral process of Internet sharing, typically through video sharing as well as on social media and email. The video can be shared on social media and through video sharing platforms, but the original video is owned by the copyright owner, which is usually the entity that recorded the video.

SUMMARY

Disclosed herein are systems and methods for generating a non-fungible token (NFT) that corresponds to one or more potential recordings of one or more segments of a live event. In some embodiments, a method can include displaying one or more available NFTs to a user. Each available NFT can include a start marker and an end marker defining a segment of the live event. Prior to occurrence of the segment of the live event, a user selection of at least one available NFT of the one or more available NFTs is received and transmitted to a NFT generator. Upon an occurrence of the selected at least one available NFT, data is received confirming an association between an NFT and a recording of the segment defined by the at least one available NFT.

In some embodiments, the live event is monitored for an occurrence of the selected at least one available NFT. In some embodiments, the method can further comprise displaying a broadcast of the live event. In some embodiments, the method can further comprise displaying a broadcast of the live event and determining a broadcast delay between the live event and the broadcast of the live event. In some embodiments, the method can further comprise transmitting the user selection to the NFT generator only when the user selection is received a time period greater than or equal to the broadcast delay before the start marker. In some embodiments, the NFT includes information related to a rarity indicator of the selected at least one available NFT. In some embodiments, the further information related to the rarity indicator of the at least one available NFT includes an estimated number of copies of the recording of the segment defined by the at least one available NFT. In some embodiments, the one or more available NFTs includes an option to purchase a recording of the next segment in a sporting event. In some embodiments, the start marker for the next segment corresponds to a starting of a game clock and the end marker corresponds to a stopping of the game clock. In some embodiments, the one or more available NFTs includes an option to purchase a recording of the next score in a sporting event. In some embodiments, the start marker for the recording of the next score corresponds to the ending of a commercial break before the next score occurs and the end marker for the next score corresponds to the beginning of a commercial break after the next score occurs. In some embodiments, each of the one or more available NFTs includes a price associated with the option and a description of the segment to be recorded. In some embodiments the method can further comprise deducting the price from a previously established account associated with the user upon the occurrence of the at least one available NFT of the one or more available NFTs. In some embodiments, the price for at least one of the one or more available NFTs is an exclusive rights price. In some embodiments, the price associated with each of the one or more available NFTs dynamically adjusts based upon the number of purchasers. In some embodiments, a price for at least one of the one or more available NFTs is determined by an auction where only a highest bid receives exclusive rights to the available NFT. In some embodiments, a price for at least one of the one or more available NFTs is determined by a Dutch auction process. In some embodiments, the method can further comprise limiting the number of copies of the recording of the segment defined by the selected at least one available NFT.

In some embodiments a system for generating a NFT that corresponds to one or more potential recordings of one or more segments of a live event can include a television receiver associated with a display device and a controller. The controller can include one or more processors and one or more memory devices having instructions stored thereon. When executed, the instructions can cause the one or more processors to send an instruction to the television receiver to display one or more available NFTs on the display device. Each available NFT can include a start marker and an end marker defining a segment of the live event. The system can include instructions to cause the processors, prior to occurrence of the segment of the live event, to receive a user selection of at least one available NFT of the one or more available NFTs and transmit the user selection to a NFT generator. Upon an occurrence of the selected at least one available NFT, the processors can receive data confirming an association between an NFT and a recording of the segment defined by the selected at least one available NFT.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 3A illustrates a graphical user interface (GUI) configured for presenting available NFTs to a user according to embodiments of the disclosed technology;

Figure 1:
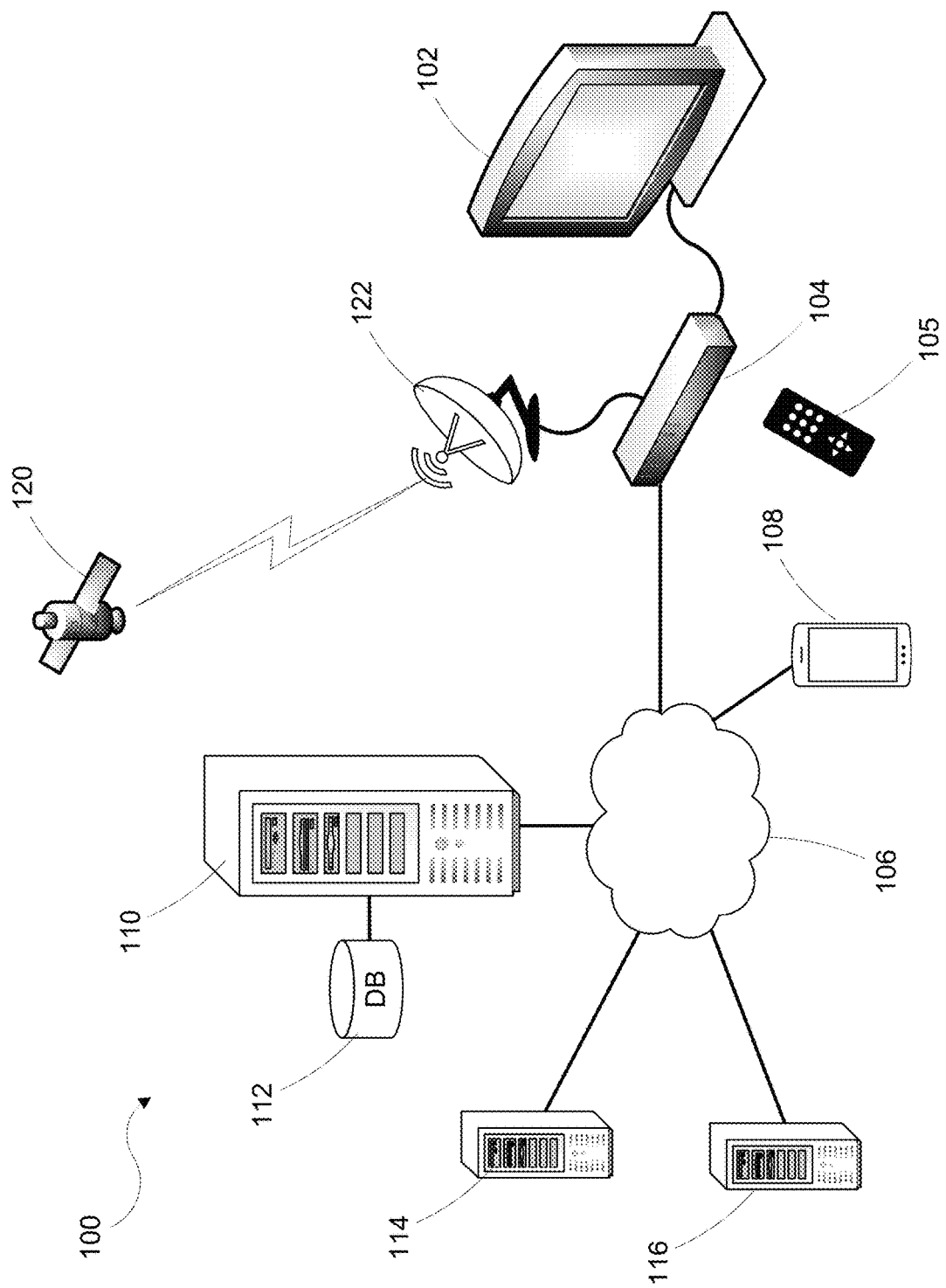
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed herein are systems and methods for generating a NFT that corresponds to one or more potential recordings of one or more segments of a live event. The system presents users with various NFTs available for purchase that are associated with recordings of events (e.g., touchdown or interception) that could occur during the live event, before those events occur. In live events, such as sporting events, certain things happen that become famous. For example, a great touchdown completion or last minute comeback, especially during an important game, can become well known. Conventionally, these video segments are owned by the copyright owner, which is usually the entity that recorded the video. The disclosed technology allows a user to purchase or bid on recordings of certain events or occurrences before they happen in the hope that the event will be significant and gain notoriety. If the event goes viral or otherwise gains notoriety, the NFT that corresponds to the recording of that event will increase in value and the user will have the opportunity to sell or trade the NFT at a profit or for a benefit. Thus, the disclosed technology allows users to invest in recordings and/or pictures of future events which can add to the enjoyment and engagement a user feels relative to an event.

A NFT is a unique unit of data employing technology that allows digital content to be logged and authenticated using blockchains. Once content is logged onto the blockchain, every transaction associated with the NFT, from transfers to sales, is recorded on the blockchain. A blockchain is a distributed database of records, called blocks, that are shared among nodes in a decentralized peer-to-peer computer network. Blockchains are also referred to as distributed ledger technology (DLT). The blocks are linked and secured using cryptography to provide a secure and decentralized record of transactions. Each block typically contains a cryptographic hash of the previous block, a timestamp, and transaction data. New blocks added to a blockchain are stored chronologically. After a block has been added to the end of a blockchain, it is essentially impossible to alter the contents of the block because a majority of the network must reach a consensus to do so. Each block contains its own hash code, along with the hash code of the preceding block. If the information in a block is edited in any way, the hash codes change as well, which would no longer agree with the codes stored in all the other computers on the network. NFTs have unique identification codes and metadata that distinguish them from each other. Thus, unlike cryptocurrencies, NFTs are not fungible and cannot be traded as equivalent. Using the blockchain provides for an easily accessible ledger of provenance. Accordingly, NFTs using blockchain technology facilitate owning and selling digital content. Although the disclosed systems are described as using NFT technology to track and validate video segment purchases, other technologies can be used as well, such as for example, secure encrypted metadata that captures e.g., date, purchaser identity, seller identity, price, a video segment identifier, video source, etc.

FIG. 1 illustrates an example simplified block diagram of a system 100 for generating NFTs that correspond to one or more potential recordings of segments of a live event. The system 100 can include, a television 102, a television receiver such as set-top box (STB) 104, a remote control 105, a controller 110, an available NFT database 112, and optionally a cloud environment 106. The system 100 can also include or be in communication with an NFT pricing system 114 and a NFT generator system 116. Optionally, the system 100 can include or be in communication with a user device 108. The user device 108 can be a desktop computer or a mobile device, such as a cellular telephone, a tablet computer, a smartwatch, or any other mobile device. While depicted separately, STB 104, controller 110, NFT pricing system 114, and NFT generator system 116 can optionally be combined into a single computer system.

In some examples, the STB 104 can be in communication with a satellite-based television distribution system via a satellite dish 122. Satellite-based television distribution systems often include one or more satellites 120 and satellite transmission equipment (not shown). Although the system is described with respect to a satellite-based distribution system, cable, IP-based, wireless, and broadcast focused systems are also possible. While only one satellite dish 122, STB 104, remote 105, and display device 102 (collectively referred to as "user equipment") are illustrated, it should be understood that multiple (e.g., tens, thousands, millions of) instances and types of user equipment may receive data and television signals from satellite-based television distribution systems (e.g., satellite 120).

Figure 2:
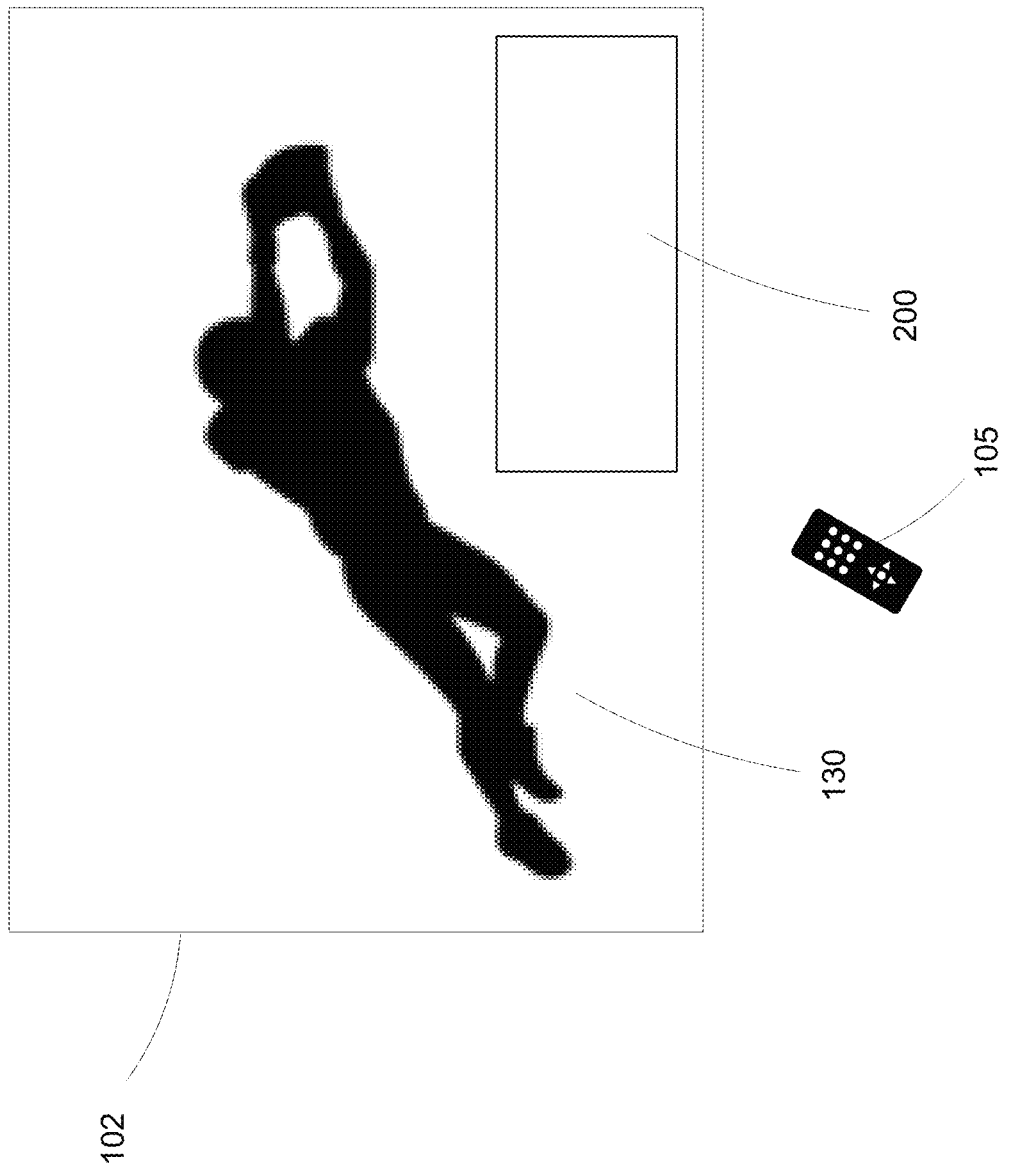
FIG. 2 is a diagram illustrating an available NFT interface arrangement for a sports event according to embodiments of the disclosed technology.

FIG. 2 illustrates an available NFT interface arrangement for a sports event according to embodiments of the disclosed technology. A broadcast of a live event such as a football game 130 can be displayed on a display device, such as television 102. Various available NFTs can be displayed on a GUI 200. Although, the GUI 200 is depicted as being displayed during a live event, the GUI 200 can be available prior to a live event. In other words, available NFTs can be selected before or during a live event as long as the selection is made prior to the occurrence of the selected NFT. The GUI 200 can use a portion of the display device (e.g., picture-in-picture), as depicted, or in some embodiments, the GUI can occupy the entire display similar to an electronic program guide (EPG). In some embodiments, the available NFTs GUI 200 can be accessed from an EPG or can be part of the EPG. A user can enter the GUI 200 and navigate the available NFTs using the remote control 105, for example. In some embodiments, the GUI 200 can be presented on a user device 108. Although the disclosed technology is described with respect to a sporting event, this technology can be applied to other live events, such as concerts, performing arts, trials, debates, award shows, and rocket launches to name a few.

FIG. 3A illustrates an available NFTs GUI 200 in the form of a table/menu containing multiple available NFTs 211-215 available for purchase or bid. For each available NFT, the table 200 can provide a description 201, the current price or bid 204, the purchase type 206, the number of purchasers or bidders 208, the number of copies 210 to be sold or auctioned, and a likelihood that the event will occur 220. The table 200 can also include indicators 225 to indicate the available NFTs in which a user is participating. A user can navigate the GUI 200 with the remote control 105 to select a desired NFT, input bid/price information, select transaction type, enter delivery preferences, and make other selections. In some embodiments, the system determines a broadcast delay between the live event and the broadcast of the live event and transmits the user selection to the NFT generator 116 only when the user selection is received a time period greater than or equal to the broadcast delay before the start marker. In some embodiments, the price of a selected NFT is deducted from a previously established account associated with the user upon the occurrence of the NFT.

Each available NFT 211-215 includes a start marker and an end marker defining a segment of the live event to be recorded. For example, NFT 211 is described as the "Last Score of the Game," which can refer to a time segment in e.g., football game 130 having a start marker defined as the ending of a commercial break before the final score of the game occurs and the end marker defined as the end of the game.

The available NFTs 212-215 each correspond to a segment described as the "Next Interception," "Next Play," "Next Score," and "Last Play," respectively. Each segment can define a start marker corresponding to the ending of a commercial break before the next occurrence (i.e., interception, play, or score) takes place and an end marker corresponding to the beginning of a commercial break after the next occurrence takes place. In some embodiments, the start marker for a segment can correspond to a starting of a game clock and the end marker can correspond to a stopping of the game clock before and after the associated occurrence.

In some embodiments, the available NFTs are based on a player or team being involved in an occurrence. For example, an available NFT can be based on a team winning or losing a game. If the selected team wins, a NFT is associated with video of the event(s) (e.g., interception, great pass, or bad penalty, compilation) that determined the outcome of the game. If the team loses, the NFT can be associated with a video of the event(s) associated with the cause of the loss (e.g., fumble). Available NFTs can also be based on a particular player hitting a home run in the next game (or anytime within the season) or a particular player being responsible for or causing a win. An available NFT can also be for a player "season pass" where the user receives all of the video or highlights for that player for the year. In some embodiments, a user can purchase an NFT for a group of players, such as "All-Star" players. Available NFTs can include purchasing a "cycle" (single, double, triple, homer) or "ordered cycle." In some embodiments, a user can purchase a "Reverse" NFT, where a user pays a premium to remove all available NFTs for an event or occurrence.

The price/bid 204 is displayed next to each available NFT description 202. The price/bid can be the price of the NFT set by the system or a current bid or market price depending on the type of transaction 206 selected. In some cases, the price is set by the system, such as an Exclusive purchase where the system sets the price for a single copy of a particular occurrence, e.g., Last Score of the Game 211. In some embodiments, the prices can change dynamically based on the likelihood that an event will occur. For example, the price of an available NFT for a touchdown will be higher if the offense has the ball in the red zone as opposed to mid-field. In some cases, the user can select the type of transaction they wish to participate in for a given NFT. Some examples of transaction types include Exclusive, Market based, high bid auction, Dutch auction, and uncapped. Although particular transaction types are disclosed herein, other suitable transaction types can be used/provided with the disclosed technology.

The number of Purchasers/Bidders 208 and the number of Copies 210 can be dependent on the transaction type. For example, the Exclusive NFT 211 will have a single purchaser for a single copy. For a Market transaction the number of purchasers and number of copies can correspond one to one. Furthermore, the price associated with a Market transaction, for example, can be dynamically adjusted based upon the number of purchasers. In some embodiments, the Market transaction, for example, can also be limited to a fixed maximum number of copies. In a Dutch auction, the number of bidders can be hidden. In an uncapped transaction, if a user pays the set price, then they receive the NFT with no cap on the number of NFTs that can be purchased. Thus, the number of purchasers will match the number of copies. The number of copies 210 provides an estimate of the number of available copies of the particular NFT. The number of copies 210 can also indicate the rarity of the NFT. In some embodiments, if the selected NFT event does not occur the system can credit the user some or all of the price of the NFT. In some embodiments, the user can purchase an option to buy an available NFT if it does occur. Once the event occurs the user would owe an additional amount to receive the NFT.

In some embodiments, the available NFTs GUI 200 can include a notification field 230 to convey information related to a selected available NFT. For example, the depicted notification field 230 indicates that one of the user's default preferences for the selected "Next Interception" 212 is not available.

In some embodiments, the system clips the selected NFT segment from a recording of the entire event. The system can determine that the selected NFT occurred and then clips the segment based on the start and end markers defined in the available NFT. In other embodiments, the segments are recorded individually as they occur. Individual segments can be recorded based on predefined markers, such as the ending and beginning of commercial breaks or game clock start and stop. After the system determines that an available NFT has occurred the corresponding segment recording can be associated with the NFT. In some embodiments, each segment recording is associated with an NFT. In other embodiments, multiple segment recordings can be associated with a single NFT.

Figure 3B:
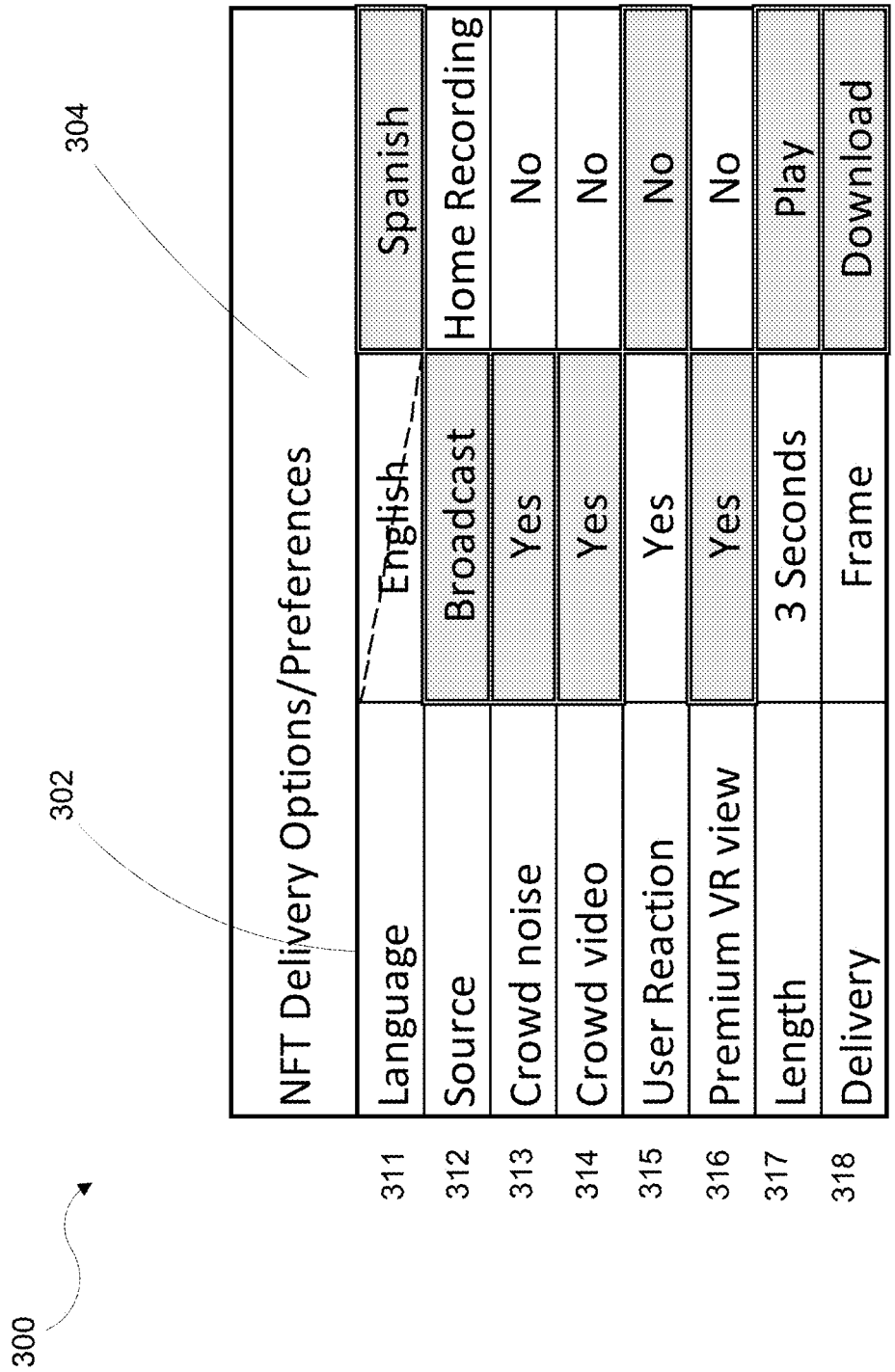
FIG. 3B illustrates a GUI configured for presenting available NFT delivery options/preferences to a user according to embodiments of the disclosed technology.

FIG. 3B illustrates a NFT delivery options/preferences GUI 300. The delivery options GUI 300 can be presented on the display device separately or concurrently with the available NFTs GUI 200. The delivery options GUI 300 can be used to set default user preferences as well as set options for specific available NFTs selected from available NFTs GUI 200, for example. The delivery options GUI 300 is configured to present a user with various options 302 and corresponding choices 304 that can be selected by the user. For example, options 311-318 include language, source, crowd noise, crowd video, user reaction, premium VR view, length, and delivery, respectively. If a particular option choice is not available for a particular NFT, the choice can be omitted or otherwise marked as unavailable as shown for "English." The crowd noise 313, crowd video 314, and user reaction 315 can all be separate recordings that are combined with a corresponding segment recording, all of which can be associated with the same NFT. The premium VR view option 316 can be a virtual reality three-dimensional (3D) presentation of the segment that a user can purchase for an extra cost. In some embodiments, the length 317 of the recording can be selected. For example, a user can choose between a period of play, such as a play, quarter, inning, at bat, etc. In some cases, a user can select a length of time, such as 3 seconds. In some embodiments, a user can select different delivery options 318. Delivery options can include downloading the NFT and video to the users device, a digital picture frame that contains the NFT and video delivered to the user, or uploading to an NFT marketplace.

Figure 3C:
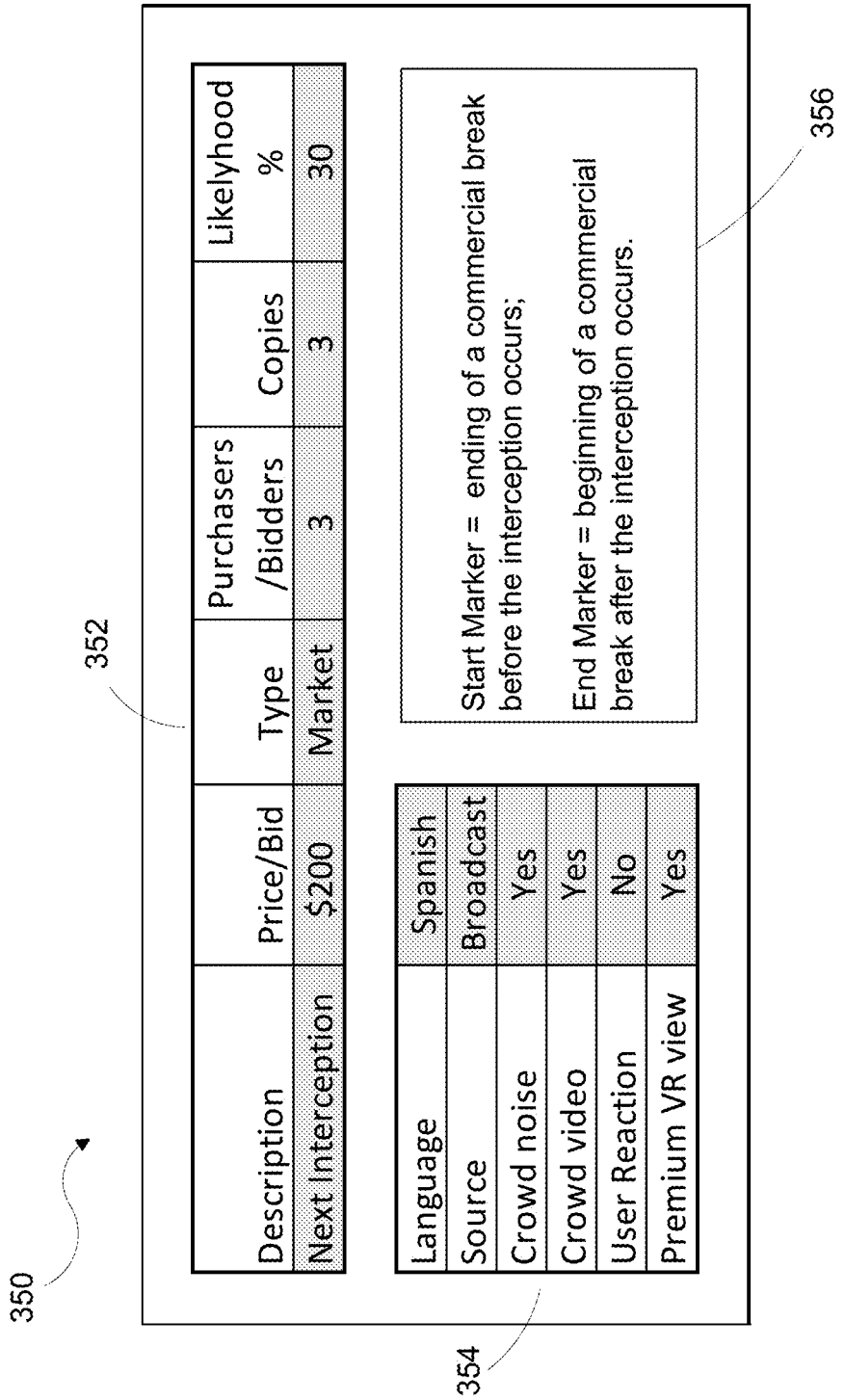
FIG. 3C illustrates a NFT selection confirmation screen according to embodiments of the disclosed technology.

FIG. 3C illustrates a NFT selection confirmation screen 350. Confirmation screen 350 can display the details of the selected NFT 352 and delivery preferences 354. The confirmation screen 350 can also include details 356 regarding the start and end markers for the recording.

In some embodiments, the system can be integrated with one or more of a user's social media accounts. Once a user purchases an available NFT the system can automatically post the purchased NFT to the users account(s). The system can also send updates regarding the outcome of purchased NFT, including whether the event occurred and a current value of the NFT. The system can also provide available NFT recommendations via a user's social media accounts.

Figure 4:
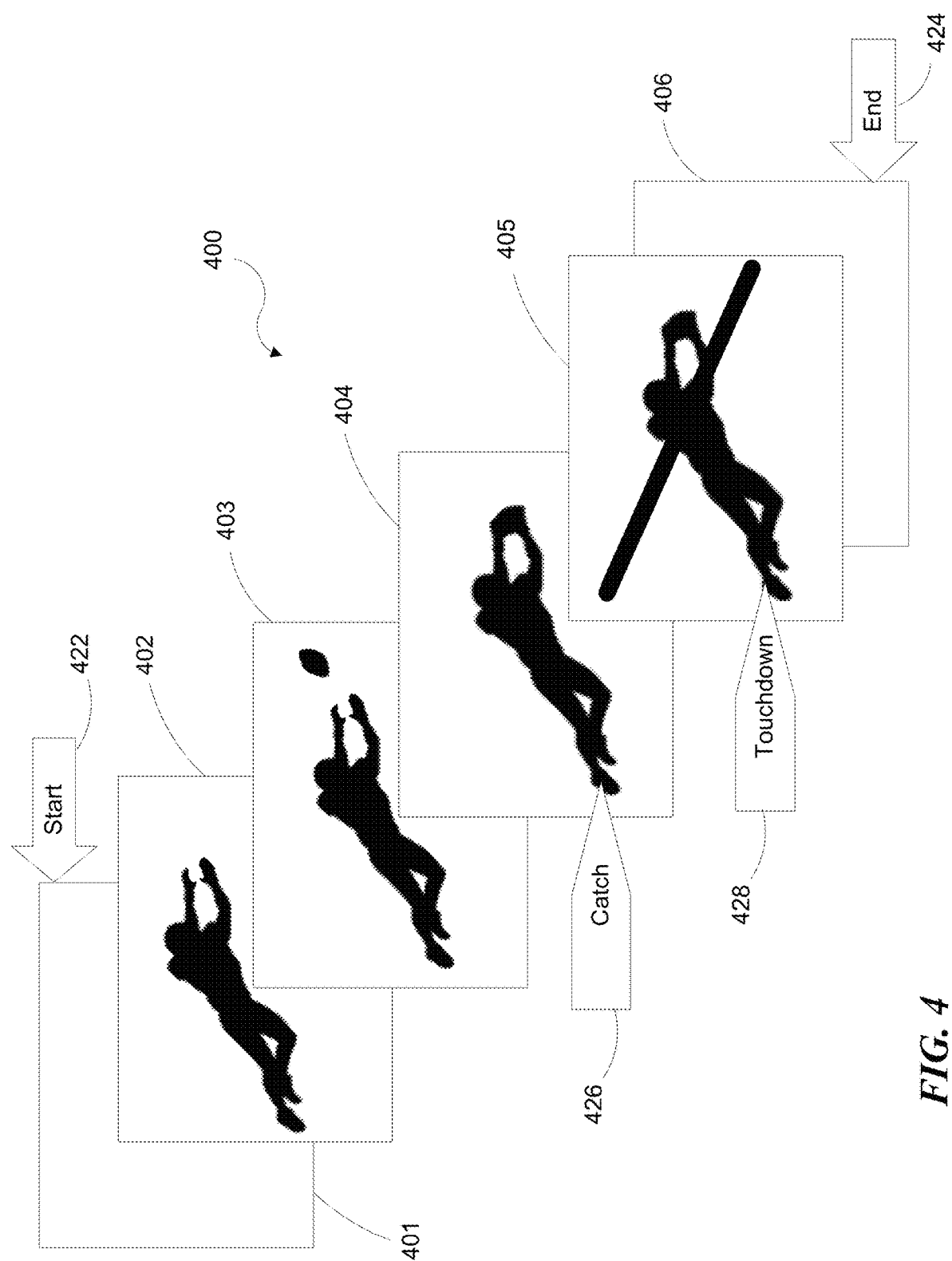
FIG. 4 is a diagram of multiple video frames illustrating segment markers and occurrence tags according to embodiments of the disclosed technology.

FIG. 4 shows multiple video frames 401-406 illustrating segment markers 422, 424 and occurrence tags 426, 428. Frame 401 is the last frame in a commercial break and is the start marker 422 for video segment 400. The end marker 424 is the first frame 406 in a subsequent commercial break. Frames 402 and 403 show action leading up to a catch 426 and resulting touchdown 428, each of which are tagged accordingly. The system can use the tags and markers to determine that an NFT event has occurred and clip or record the segment based on the markers. In some embodiments, the video of an event is marked and tagged manually, using artificial intelligence (AI), based on metadata, and/or optical character recognition (OCR) of information displayed on screen. For example, the system can determine that a particular batter is coming to the plate based on image recognition of a bat and OCR of the number on the player's jersey.

Figure 5A:
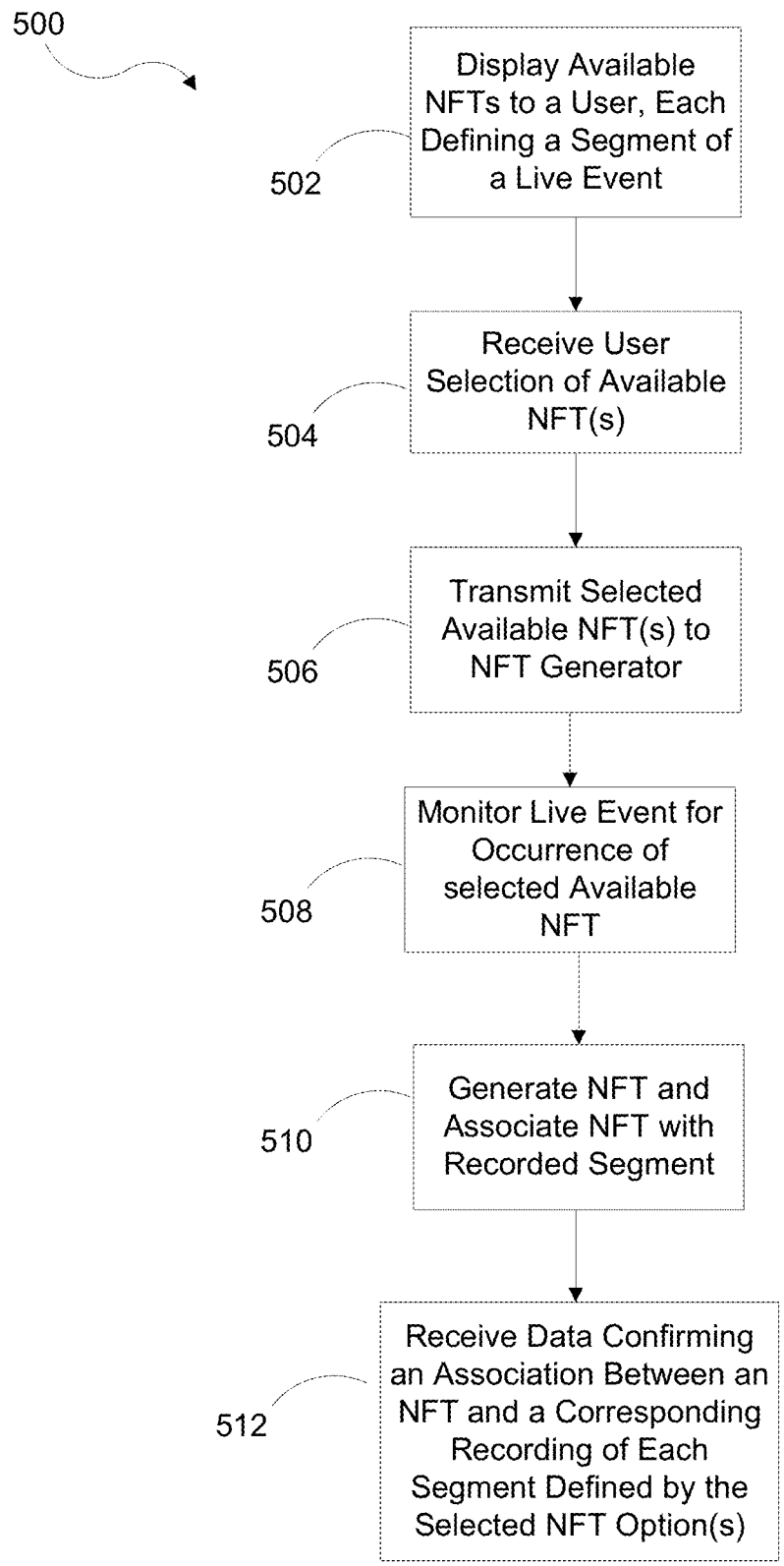
FIG. 5A is a flow diagram showing a method for generating NFTs corresponding to potential recordings of segments of a live event according to some embodiments of the disclosed technology.

FIG. 5A is a flow diagram showing a representative method of operation 500 of a processor-based system for generating a NFT that corresponds to one or more potential recordings of one or more segments of a live event. In some embodiments, the method 500 can include displaying one or more available NFTs to a user at step 502. Each available NFT includes a start marker and an end marker defining a segment of the live event to be recorded. Prior to occurrence of the segment of the live event, a user selection of at least one available NFT of the one or more available NFTs is received at step 504 and transmitted to a NFT generator at step 506. At step 508, the live event is monitored for an occurrence of the selected at least one available NFT by e.g., controller 110. Upon an occurrence of the selected at least one available NFT of the one or more available NFTs, at step 510 a NFT is generated for each selected available NFT and associated with the corresponding recorded segment. Upon the occurrence of the at least one available NFT, data is received, at step 512, confirming an association between an NFT and a recording of the segment defined by the selected at least one available NFT.

Figure 5B:
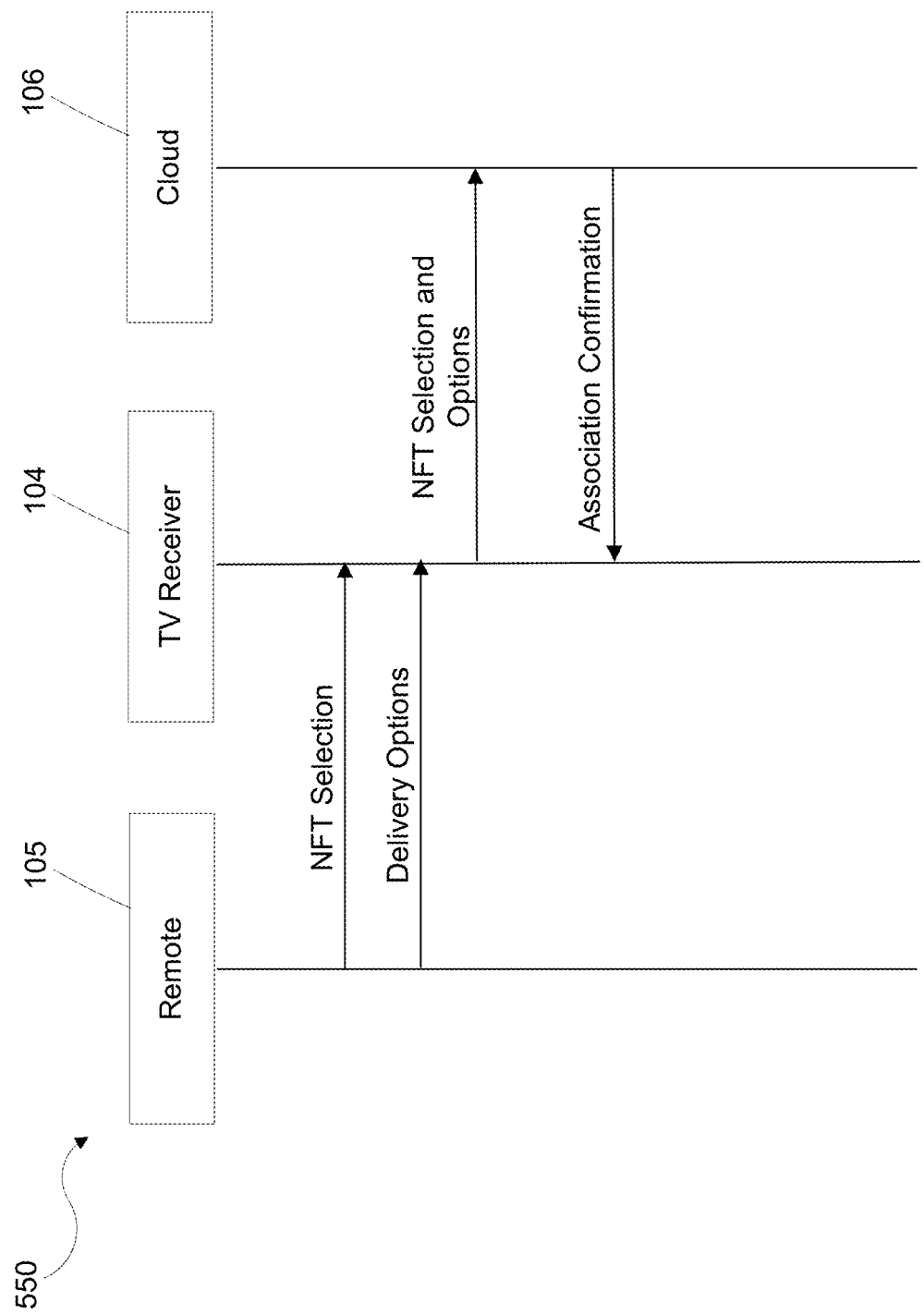
FIG. 5B is a sequence diagram illustrating information flow between system components according to some embodiments of the disclosed technology.

FIG. 5B is a sequence diagram 550 illustrating the information flow between system components e.g., remote 105, TV receiver 104, and cloud 106. TV receiver 104 receives an NFT selection and Delivery options from Remote controller 105. The receiver 104 forwards the NFT selection and options to NFT generator in the cloud 106. The cloud 106 returns confirmation of the association between an NFT and a recording of the segment defined by the selected available NFT.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 6:
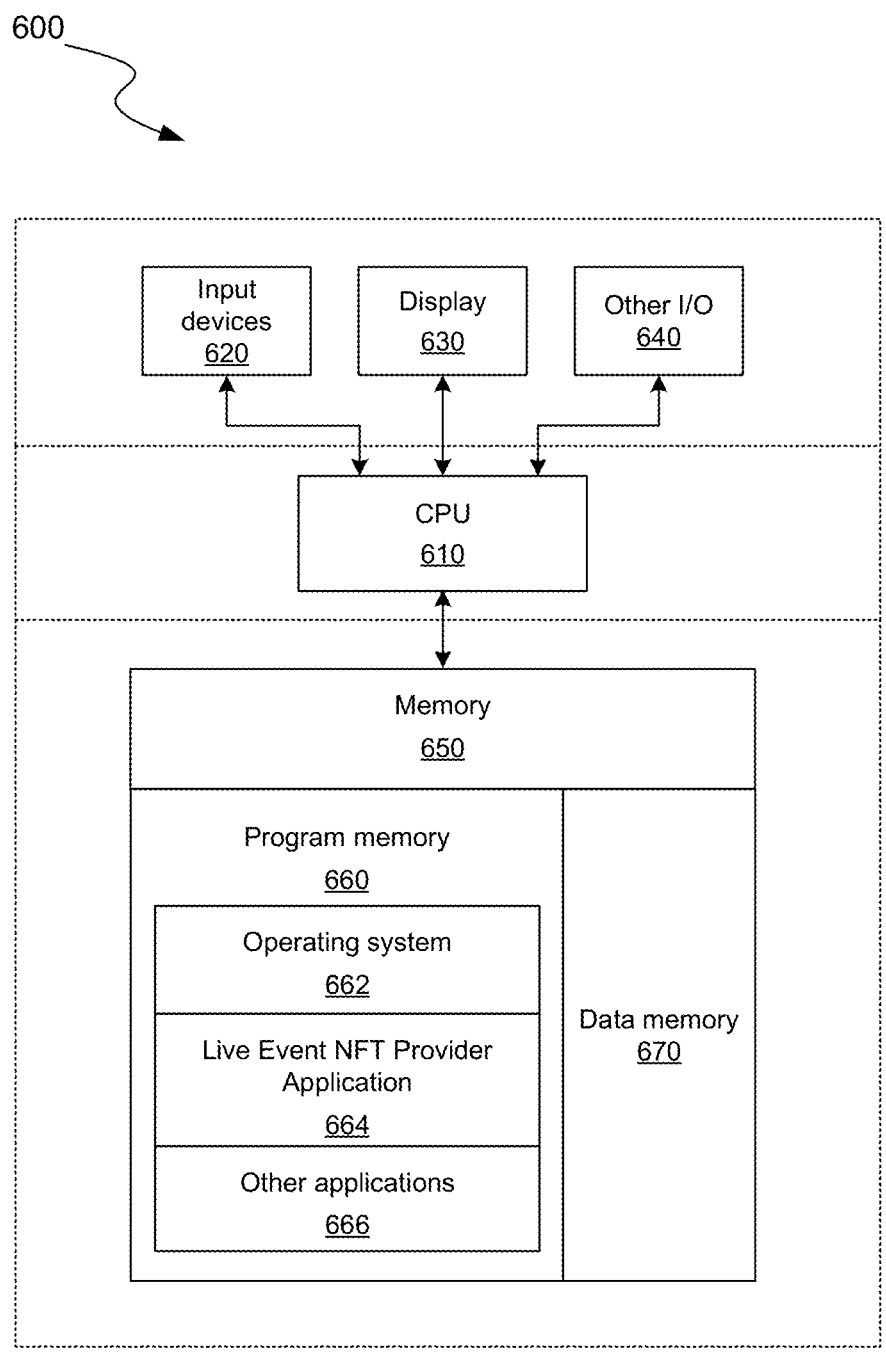
FIG. 6 is a block diagram illustrating an overview of devices on which some implementations can operate.

Several implementations are discussed below in more detail in reference to the figures. FIG. 6 is a block diagram illustrating an overview of devices on which some implementations of the disclosed technology can operate. The devices can comprise hardware components of a device 600. Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics. In some examples, display 630 provides graphical and textual visual feedback to a user. In some implementations, display 630 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 640 can also be coupled to the processor, such as a network card, video card, audio card, USB, FireWire or other external device, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, TCP/IP protocols. Device 600 can utilize the communication device to distribute operations across multiple network devices.

The CPU 610 can have access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 650 can include program memory 660 that stores programs and software, such as an operating system 662, a Live Event NFT Provider application 664, and other application programs 666. Memory 650 can also include data memory 670 that can include broadcast schedule information and/or available NFT information, etc., which can be provided to the program memory 660 or any element of the device 600.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 7:
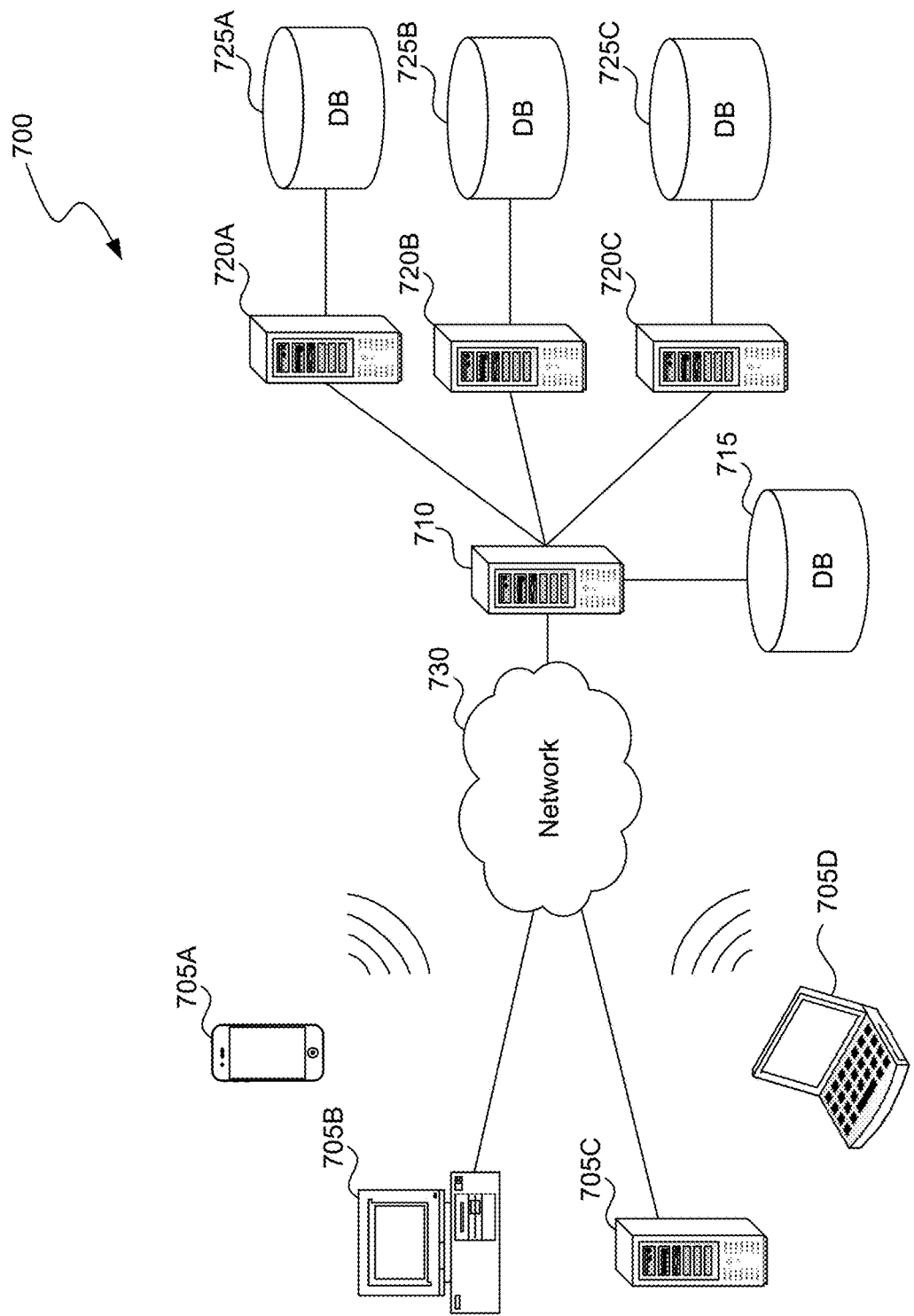
FIG. 7 is a block diagram illustrating an overview of an environment in which some implementations can operate.

FIG. 7 is a block diagram illustrating an overview of an environment 700 in which some implementations of the disclosed technology can operate. Environment 700 can include one or more client computing devices 705A-D, examples of which can include device 600. Client computing devices 705 can operate in a networked environment using logical connections through network 730 to one or more remote computers, such as a server computing device 710.

In some implementations, server computing device 710 can be an edge server that receives client requests and coordinates fulfillment of those requests through other servers, such as servers 720A-C. Server computing devices 710 and 720 can comprise computing systems, such as device 600. Though each server computing device 710 and 720 is displayed logically as a single server, server computing devices can each be a distributed computing environment encompassing multiple computing devices located at the same or at geographically disparate physical locations. In some implementations, each server computing device 720 corresponds to a group of servers.

Client computing devices 705 and server computing devices 710 and 720 can each act as a server or client to other server/client devices. Server 710 can connect to a database 715. Servers 720A-C can each connect to a corresponding database 725A-C. As discussed above, each server 720 can correspond to a group of servers, and each of these servers can share a database or can have their own database. Databases 715 and 725 can warehouse (e.g., store) information such as for example user account information, available NFT information, pricing information, segment definitions, and/or user preferences. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. Network 730 may be the Internet or some other public or private network. Client computing devices 705 can be connected to network 730 through a network interface, such as by wired or wireless communication. While the connections between server 710 and servers 720 are shown as separate connections, these connections can be any kind of local, wide area, wired, or wireless network, including network 730 or a separate public or private network.

Figure 8:
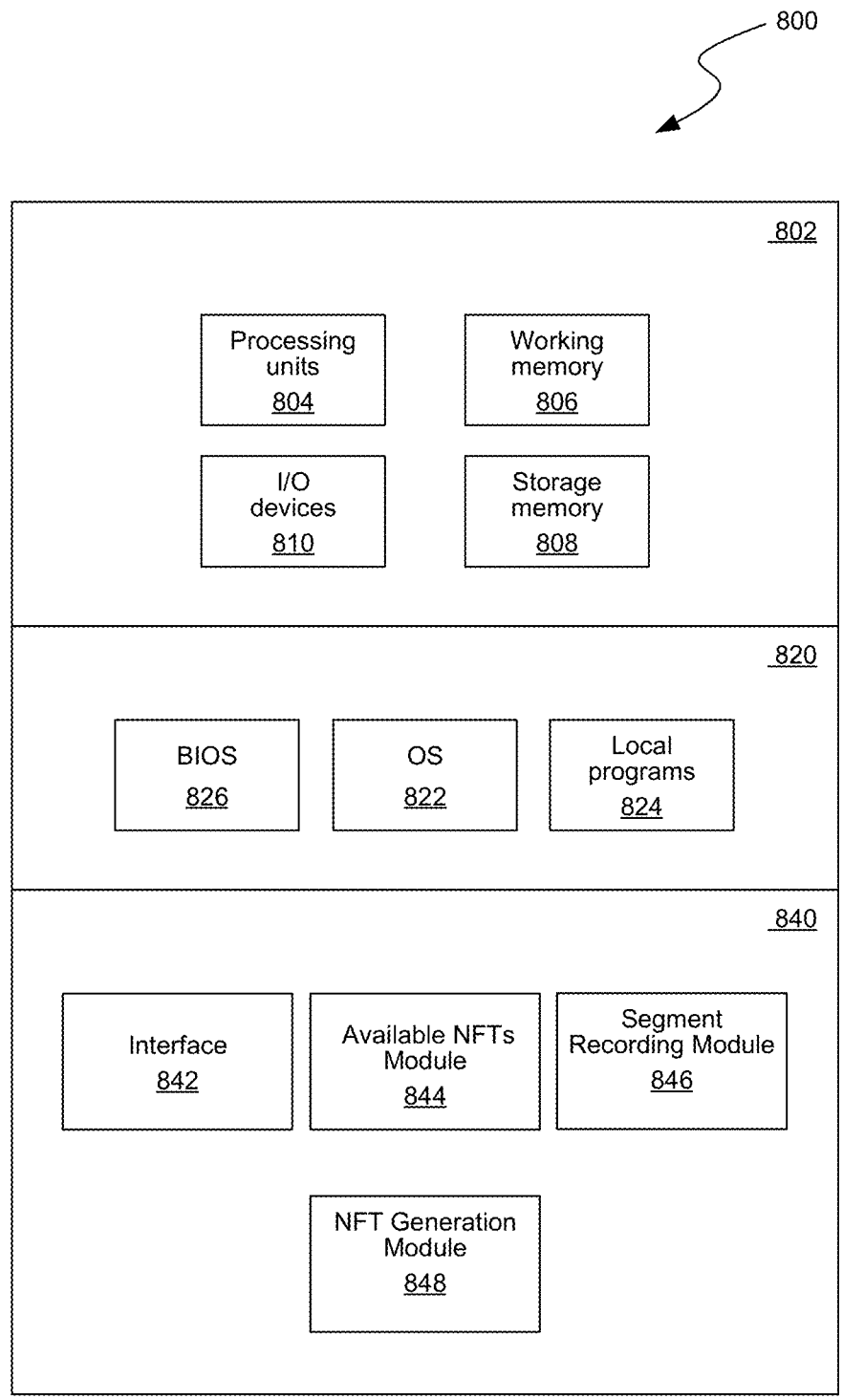
FIG. 8 is a block diagram illustrating components which, in some implementations, can be used in a system employing the disclosed technology.

FIG. 8 is a block diagram illustrating components 800 which, in some implementations, can be used in a system employing the disclosed technology. The components 800 include hardware 802, general software 820, and specialized components 840. As discussed above, a system implementing the disclosed technology can use various hardware, including processing units 804 (e.g., CPUs, GPUs, APUs, etc.), working memory 806, storage memory 808, and input and output devices 810. Components 800 can be implemented in a client computing device such as client computing devices 705 or on a server computing device, such as server computing device 710 or 720.

General software 820 can include various applications, including an operating system 822, local programs 824, and a basic input output system (BIOS) 826. Specialized components 840 can be subcomponents of a general software application 820, such as local programs 824. Specialized components 840 can include an Available NFTs module 844, Segment Recording module 846, NFT Generation module 848, and components that can be used for transferring data and controlling the specialized components, such as interface 842. In some implementations, components 800 can be in a computing system that is distributed across multiple computing devices or can be an interface to a server-based application executing one or more of specialized components 840.

Those skilled in the art will appreciate that the components illustrated in FIGS. 6-8 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for generating a non-fungible token (NFT) that corresponds to one or more potential video clips of one or more segments of a live event, the method comprising:
   displaying, via a user interface, one or more available NFTs, each available NFT is associated with a start marker and an end marker defining the one or more segments of the live event;
   prior to occurrence of an event segment of the live event, receiving, by the user interface, a user selection of at least one available NFT associated with the event segment;
   monitoring the live event for an occurrence of the event segment of the live event;
   upon the occurrence of the event segment, generating an NFT for the event segment of the live event;
   tagging one or more frames in a recording of the event segment based on at least one action identified in the one or more frames; and
   sending, to a user device, data confirming an association between the NFT and the recording of the event segment.

2. The method of claim 1, further comprising displaying a broadcast of the live event.

3. The method of claim 1, further comprising displaying a broadcast of the live event and determining a broadcast delay between the live event and the broadcast of the live event.

4. The method of claim 3, further comprising transmitting the user selection to an NFT generator only when the user selection is received a time period greater than or equal to the broadcast delay before a start marker of the event segment.

5. The method of claim 1, wherein the NFT includes information related to a rarity indicator of the at least one available NFT.

6. The method of claim 5, wherein the information related to the rarity indicator of the at least one available NFT includes an estimated number of copies of the recording of the event segment defined by the at least one available NFT.

7. The method of claim 1, wherein the one or more available NFTs includes an option to purchase a recording of a next segment in a sporting event.

8. The method of claim 7, wherein a start marker for the next segment corresponds to a starting of a game clock and an end marker corresponds to a stopping of the game clock.

9. The method of claim 1, wherein the one or more available NFTs includes an option to purchase a recording of a next score in a sporting event.

10. The method of claim 9, wherein a start marker for the recording of the next score corresponds to an ending of a commercial break before the next score occurs and an end marker for the next score corresponds to a beginning of a commercial break after the next score occurs.

11. The method of claim 1, wherein each of the one or more available NFTs includes a price associated with an option and a description of the event segment to be recorded.

12. The method of claim 11, further comprising deducting the price from a previously established account associated with the user device upon the occurrence of the at least one available NFT of the one or more available NFTs.

13. The method of claim 11, wherein the price for at least one of the one or more available NFTs is an exclusive rights price.

14. The method of claim 11, wherein the price associated with each of the one or more available NFTs dynamically adjusted based upon a number of purchasers.

15. The method of claim 1, wherein a price for at least one of the one or more available NFTs is determined by an auction where only a highest bid receives exclusive rights to the at least one available NFT.

16. The method of claim 1, wherein a price for at least one of the one or more available NFTs is determined by a Dutch auction process.

17. The method of claim 1, further comprising limiting a number of copies of the recording of the event segment defined by the at least one available NFT.

18. A system for generating a non-fungible token (NFT) that corresponds to one or more potential recordings of one or more segments of a live event, the system comprising:
   a television receiver associated with a display device; and
   a controller, comprising:
      one or more processors; and
      one or more memory devices having stored thereon instructions that when executed by the one or more processors cause the one or more processors to:
         send an instruction to the television receiver to display one or more available NFTs on the display device, each available NFT including a start marker and an end marker defining a segment of the live event;

prior to occurrence of an event segment of the live event, receive a user selection of at least one available NFT associated with the event segment;

monitor the live event for an occurrence of the event segment of the live event;

upon the occurrence of the event segment, generate an NFT for the event segment of the live event;

tag one or more frames in a recording of the segment based on at least one action identified in the one or more frames; and send, to a user device, data confirming an association between the NFT and the recording of the event segment.

19. The system of claim 18, further comprising displaying a broadcast of the live event and determining a broadcast delay between the live event and the broadcast of the live event.

20. The system of claim 19, further comprising transmitting the user selection to an NFT generator only when the user selection is received a time period greater than or equal to the broadcast delay before a start marker.

\* \* \* \* \*